United States Patent
Krishna et al.

(10) Patent No.: US 9,076,117 B2
(45) Date of Patent: Jul. 7, 2015

(54) PROACTIVE MAINTENANCE OF DEVICES BASED ON USAGE DATA

(71) Applicant: Ricoh Co., Ltd., Tokyo (JP)

(72) Inventors: Vikas Krishna, San Jose, CA (US); Timothee Bailloeul, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 245 days.

(21) Appl. No.: 13/689,764

(22) Filed: Nov. 29, 2012

(65) Prior Publication Data

US 2014/0145846 A1    May 29, 2014

(51) Int. Cl.
*G08B 21/00*  (2006.01)
*G06Q 10/06*  (2012.01)

(52) U.S. Cl.
CPC ........ *G06Q 10/0639* (2013.01); *G06Q 10/0631* (2013.01)

(58) Field of Classification Search
CPC ............................ G08B 23/00; G06Q 10/0639
USPC ................... 340/540; 702/183–185; 705/305; 709/232–233; 715/738
See application file for complete search history.

(56) References Cited

U.S. PATENT DOCUMENTS

| | | | | |
|---|---|---|---|---|
| 7,197,562 B2 * | 3/2007 | Murtha et al. | ............... | 709/224 |
| 7,451,238 B2 * | 11/2008 | Taraci | ............ | 709/249 |
| 7,950,807 B2 * | 5/2011 | Shirasu et al. | ................. | 353/85 |
| 7,991,833 B2 * | 8/2011 | Benenson | ..................... | 709/203 |
| 8,016,433 B2 * | 9/2011 | Shirasu et al. | ............... | 353/85 |
| 2003/0191836 A1 * | 10/2003 | Murtha et al. | ............... | 709/224 |
| 2005/0024219 A1 * | 2/2005 | Childers | ....................... | 340/641 |
| 2006/0083521 A1 * | 4/2006 | Simpson et al. | ................ | 399/24 |
| 2013/0238925 A1 * | 9/2013 | Gerhart | ......................... | 714/4.4 |

* cited by examiner

*Primary Examiner* — Eric M Blount
(74) *Attorney, Agent, or Firm* — Patent Law Works LLP

(57) ABSTRACT

A system and method for monitoring device usage are described. The system includes an enterprise service bus configured to receive a request to transmit media to a device and route the media to a device and network appliance as a service (NAaaS) server-side application configured to log device usage entries for a second device, determine usage information based on the device usage entries, perform a comparison between a life expectancy associated with the second device and the usage information and responsive to the comparison being within a threshold value, generating a notification.

20 Claims, 7 Drawing Sheets

PROACTIVE MAINTENANCE OF DEVICES BASED ON USAGE DATA

BACKGROUND OF THE INVENTION

1. Field of the Invention

The specification relates to a system and method for monitoring device usage. In particular, the specification relates to monitoring device usage based on transactions between devices.

2. Description of the Background Art

Companies increasingly rely upon many types of devices for group and individual use. The devices each have a certain life after which they need to be serviced or replaced. Typically, that is done when the device malfunctions resulting in a disruption of the continuity of everyday business.

Some prior art systems, for example multifunction printers, record device usage through additional hardware and software embedded inside the devices. The usage data is collected either manually or by using an extra piece of hardware, for example a server, that collects and centralizes data and analytics from each device before generating a report that summarizes the usage pattern of a fleet of devices. This is problematic because each device has to come equipped with the hardware or, if possible, software has to be installed.

SUMMARY OF THE INVENTION

The invention overcomes the deficiencies of the prior art with a system for monitoring device usage. In one embodiment, the system includes one or more processors, an enterprise service bus executable by the one or more processors, the enterprise service bus configured to receive a request from a first device for a second device to perform an action and network appliance as a service (NAaaS) server-side application services executable by the one or more processors, the NAaaS server-side application services configured to receive instructions from the enterprise service bus to log a device usage entry for the request, determine usage information based on the device usage entry, compare the usage information to a life expectancy associated with the second device and generate a notification based on the comparison. In some embodiments, the NAaaS server-side application services are further configured to perform a comparison between device usage entries for the second device and a similar device to determine whether the second device is close to a breakdown point experienced by the similar device.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
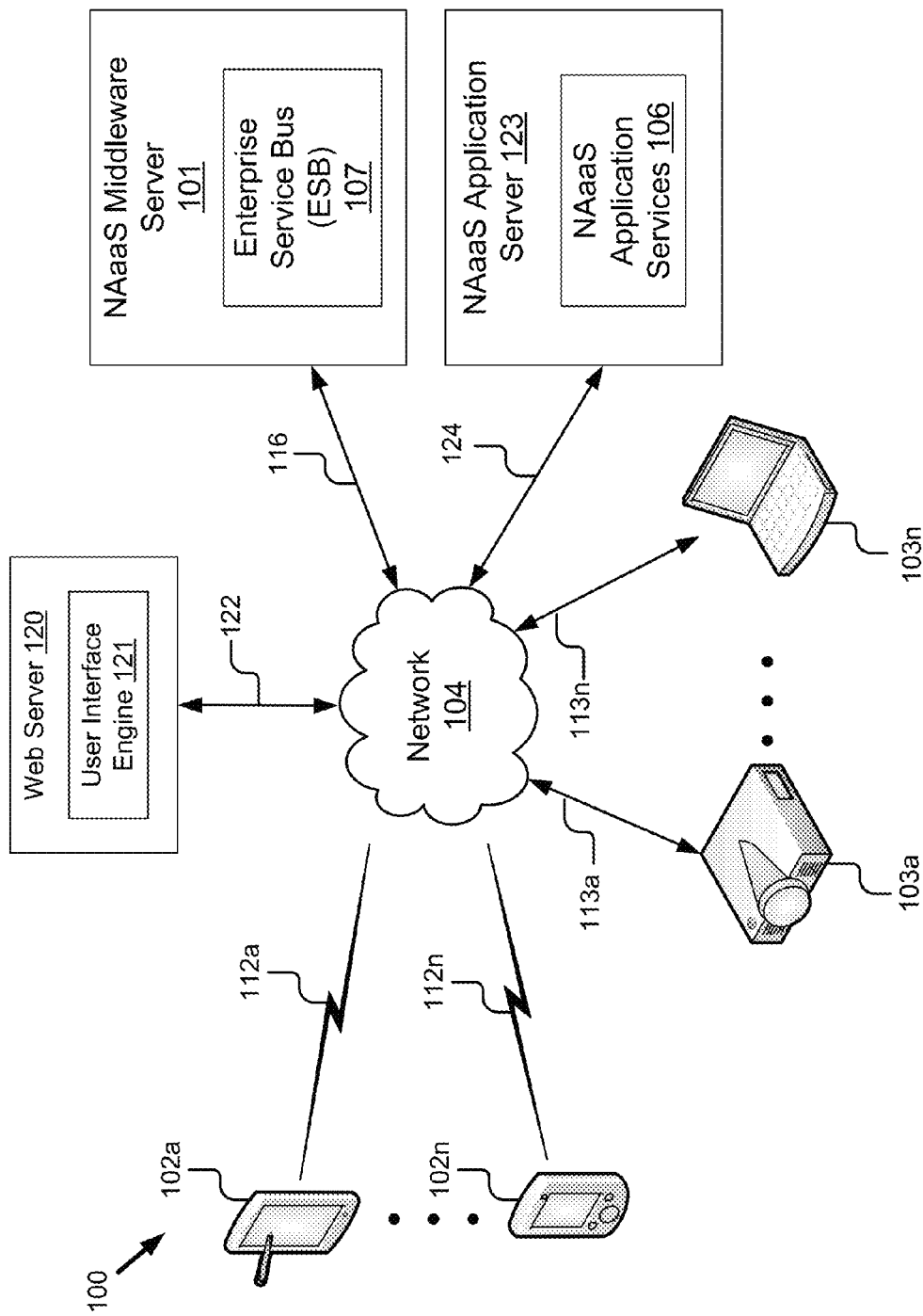
FIG. 1A is a high-level block diagram illustrating one embodiment of a system for monitoring device usage.

A system and method for monitoring device usage are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1A illustrates a high-level block diagram of a system 100 for monitoring device usage. The illustrated embodiment of the system 100 comprises: user devices 102a-102n, computing devices 103a-103n, a network 104, a web server 120, a Network Appliance As A Service (NAaaS) middleware server 101 and a NAaaS application server 123. In FIG. 1A and the remaining figures, a letter after a reference number, for example, "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of user devices 102a-102n, the plurality of computing devices 103a-103n, the web server 120, the NAaaS application server 123 and the NAaaS middleware server 101, in practice any number of networks 104 can be connected to the entities.

The user devices 102a-102n are devices associated with a particular user. For example, a company provides its employees with a mobile device or a laptop. The user devices 102a-102n are each coupled to the network 104 via signal lines 112a-112n respectively. The user device 102 is any computing device including a memory, a processor and a communication capability. For example, the user device 102 can be a tablet computer, a personal digital assistant, a smart phone, a feature phone, etc. The user devices 102 can communicate with the network 104 wirelessly or through wired connectivity. The user devices 102 include one or more user applications (not shown) that generate messages to be processed by the enterprise service bus 107.

The user device 102 is adapted for sending and receiving data to and from the NAaaS middleware server 101. For example, the user device 102 sends a command to project an image of a presentation program document on at least one of the plurality of computing devices 103a-103n to the NAaaS middleware server 101. The user device 102 includes a display for viewing information provided by the enterprise service bus 107. For example, the user device 102 receives graphical data from the NAaaS middleware server 101 for listing the plurality of computing devices 103a-103n for display on the user device 102.

The user device 102 determines its location so that the user device 102 can interact with other user devices 102 or computing devices 103 via the NAaaS middleware server 101. The user device 102 determines its location information by using global positioning system (GPS) circuitry included within the device itself to determine its location. For determining the user device's 102 location indoors, the user device 102 employs radio frequency, ultra-sound signal or invisible light communication. For example, the user device 102 determines its location through wireless access points based on measuring the intensity of received signals. The user device 102 accesses a database including pairs of media access control (MAC) addresses and locations over the Internet. To determine a location, the user device 102 retrieves the location corresponding to the access point MAC address from the database.

In another embodiment, the user device 102 performs a device discovery process that works via the network 104 using specific protocols like SNMP, ICMP, Bonjour, etc. For example, the user device 102 queries the NAaaS middleware server 101 to discover devices. The NAaaS middleware server 101 uses SNMP or ICMP protocols to discover devices and reports back to the user device 102 with the found devices together with their internet protocol (IP) address, media access control (MAC) addresses, etc.

The computing devices 103a-103n are devices associated with a particular location and/or a particular function. Computing devices 103a-103n can be assigned to a conference room or are assigned for meetings. For example, a projector and an interactive whiteboard can be assigned to a select conference room from a plurality of conference rooms inside a building. The computing devices 103a-103n are each coupled to the network 104 via signal lines 113a-113n respectively. The computing device 103 is any computing device including a memory and a processor. For example, the computing device 103 can be a projector, a monitor, a television, an interactive whiteboard, a webcam, a microphone, a loudspeaker, a CD/DVD player, an electronic paper device, an electronic reader, a desktop computer, a tablet, a smartphone, etc.

The computing device 103 is adapted for sending and receiving data to and from the NAaaS middleware server 101. For example, a projector in a conference room can receive a presentation program document from the NAaaS middleware server 101. In another example, a video conferencing device including a webcam, a microphone and a monitor in a first location can capture a real-time audio-video synchronous communication data stream and send it to another video conferencing device in a second location through the enterprise service bus 107 in the NAaaS middleware server 101.

The NAaaS middleware server 101 is any computing device including a memory and a processor which is connected to the network 104 via signal line 116. The NAaaS middleware server 101 comprises an enterprise service bus 107. The enterprise service bus is described in further detail below with reference to FIG. 2A.

The enterprise service bus 107 includes code and routines for providing a standard interface to one or more networks of disparate devices and their corresponding server clouds that are deployed independently to communicate with each other. In one embodiment, the enterprise service bus 107 executes one or more services including invocation support, routing (e.g., content based routing, static/deterministic routing, policy based routing, rules based routing) mediation, message queue (e.g., publish-subscribe), process choreography, service orchestration, complex event processing, security and management (e.g., monitoring, logging). The enterprise service bus 107 also calls methods contained in the code on the NAaaS application services 106 that implement the services. For example, the enterprise service bus 107 instructs the NAaaS application services to authenticate users, log device usage entries, store media, analyze media, index keywords related to users' skills and search a database for user profiles that include skills that match a user query.

The user devices 102a-102n or the computing devices 103a-103n use a particular messaging format over a particular communication protocol to communicate with and send service requests to each other through the enterprise service bus 107. A message format defines the structure and form of the message. For example, message formats include eXtensible Markup Language (XML), Javascript Object Notation (JSON), etc. A communication protocol defines a set of rules governing the syntax, semantics, and synchronization of communications. For example, communication protocols include File Transfer Protocol (FTP), Hypertext Transfer Protocol (HTTP), Message Queue (MQ), Internet Inter-Orb Protocol (HOP), Simple Object Access Protocol (SOAP), etc. While the enterprise service bus 107 and the NAaaS application services 106 are illustrated as being on separate servers, in one embodiment they are on the same server.

The NAaaS application server 123 is any computing device including a memory and a processor which is connected to the network 104 via signal line 124. The NAaaS application server 123 includes NAaaS application services 106, which is a collection of implementation services that are abstracted as an application and composed by the enterprise service bus 107 in order to deliver higher level services. The NAaaS application services 106 are described in further detail below with reference to FIG. 2B.

The web server 120 is any computing device including a memory and a processor that is connected to the network 104 via signal line 122. The web server 120 comprises a user interface engine 121. While the web server 120 is illustrated in FIG. 1A as being a separate server, in some embodiments the user interface engine 121 could be stored on a user device 102 or function as a standalone application.

The user interface engine 121 is software and routines for generating graphical data for displaying a user interface. In one embodiment, the user interface engine 121 is a set of instructions executable by the processor to provide the functionality described below for generating graphical data for displaying a user interface. In another embodiment, the user interface engine 121 is stored in the memory and is accessible and executable by the processor.

Figure 3:
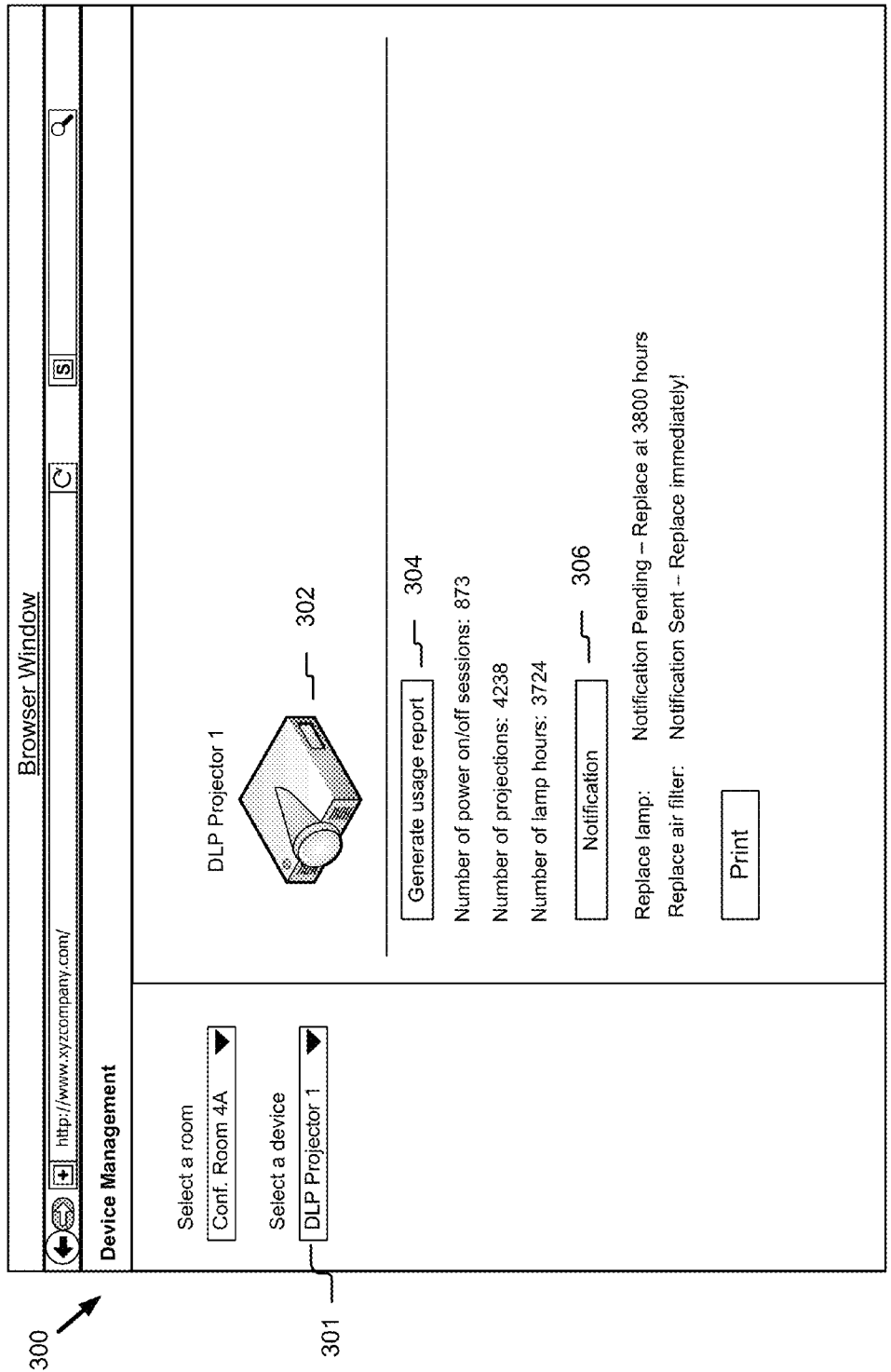
FIG. 3 is a graphic representation of one embodiment of a user interface for monitoring device usage.

The user interface engine 121 receives a request for generating graphical data for monitoring device usage. For example, the user interface engine 121 generates graphical data for displaying a webpage that includes usage information of a particular computing device 103 and recommendations for maintaining the computing device 103. FIG. 3 includes an example user interface.

Figure 1B:
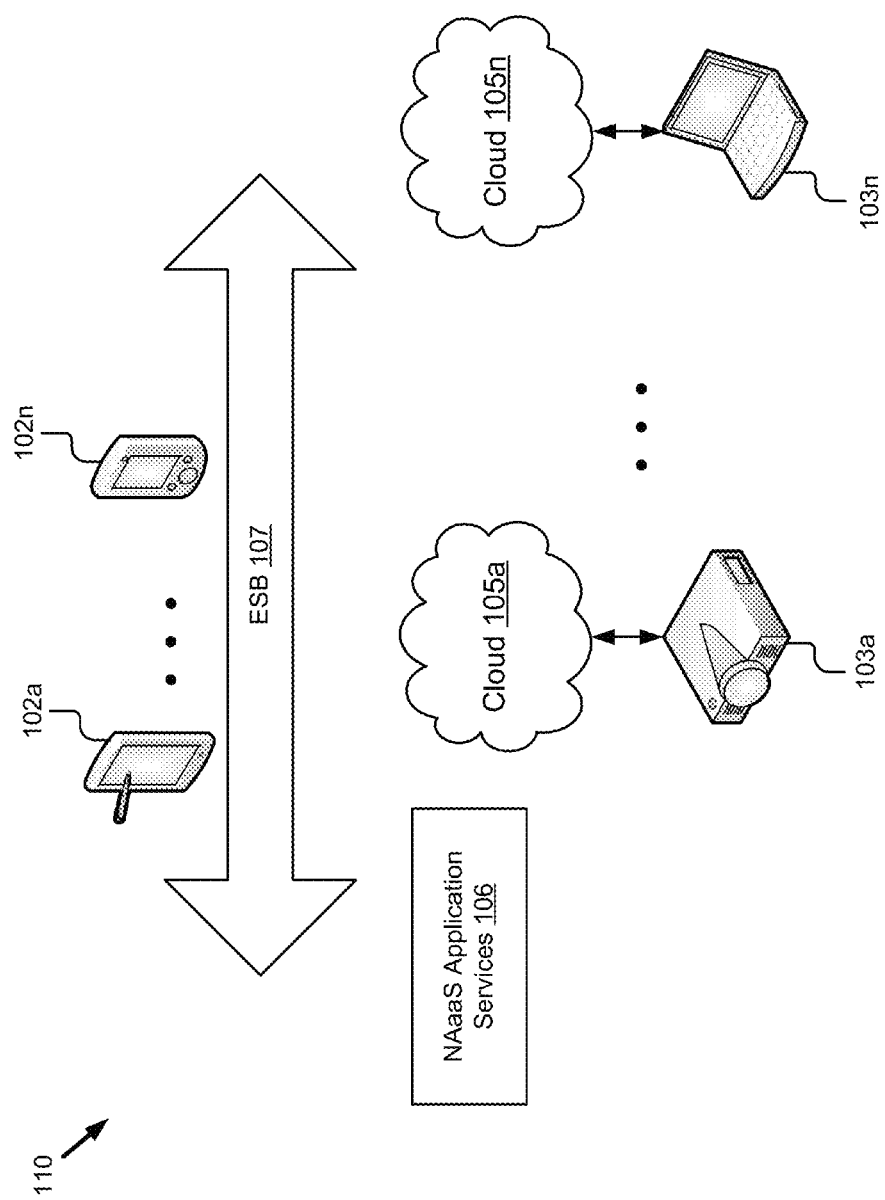
FIG. 1B is a high-level block diagram illustrating another embodiment of a system for monitoring device usage.

FIG. 1B illustrates another high-level block diagram of a system 110 for monitoring device usage according to one embodiment. The illustrated embodiment of the system 110 comprises: user devices 102a-102n as a first layer, the enterprise service bus 107 as a second layer and the NAaaS application services 106, the computing devices 103a-103n and their corresponding server clouds 105a-105n as a third layer. Each one of the server clouds 105a-105n store a copy of the media type and index the media type associated with the corresponding computing devices 103a-103n whenever the computing devices 103a-103n execute a transaction in response to a request. For example, a projector cloud server stores a projected presentation program document, a video conferencing cloud server stores a video recording of the video conference and an interactive whiteboard cloud server stores an image of the interactive whiteboard.

The enterprise service bus 107 layer processes requests coming in from the user devices 102a-102n layer and relays the requests to the NAaaS application services 106 for processing and the computing devices 103a-103n and their corresponding server clouds 105a-105n. In one embodiment, the enterprise service bus 107 layer comprises one or more ports that provide an interface for user applications on the user devices 102a-102n to connect with the enterprise service bus 107 layer to send messages and receive responses. In another embodiment, the enterprise service bus 107 layer comprises one or more ports to communicate with the NAaaS application services 106 layer and the computing devices 103. In one embodiment, a port on the enterprise service bus 107 may be of a particular port type that handles only messages and communications of a particular message format and communication protocol of a user application. In another embodiment, a port on the enterprise service bus 107 may be of a universal port type that includes a generic interface to the enterprise service bus 107 and can handle any messaging format and communication protocol combination.

Enterprise Service Bus

Figure 2A:
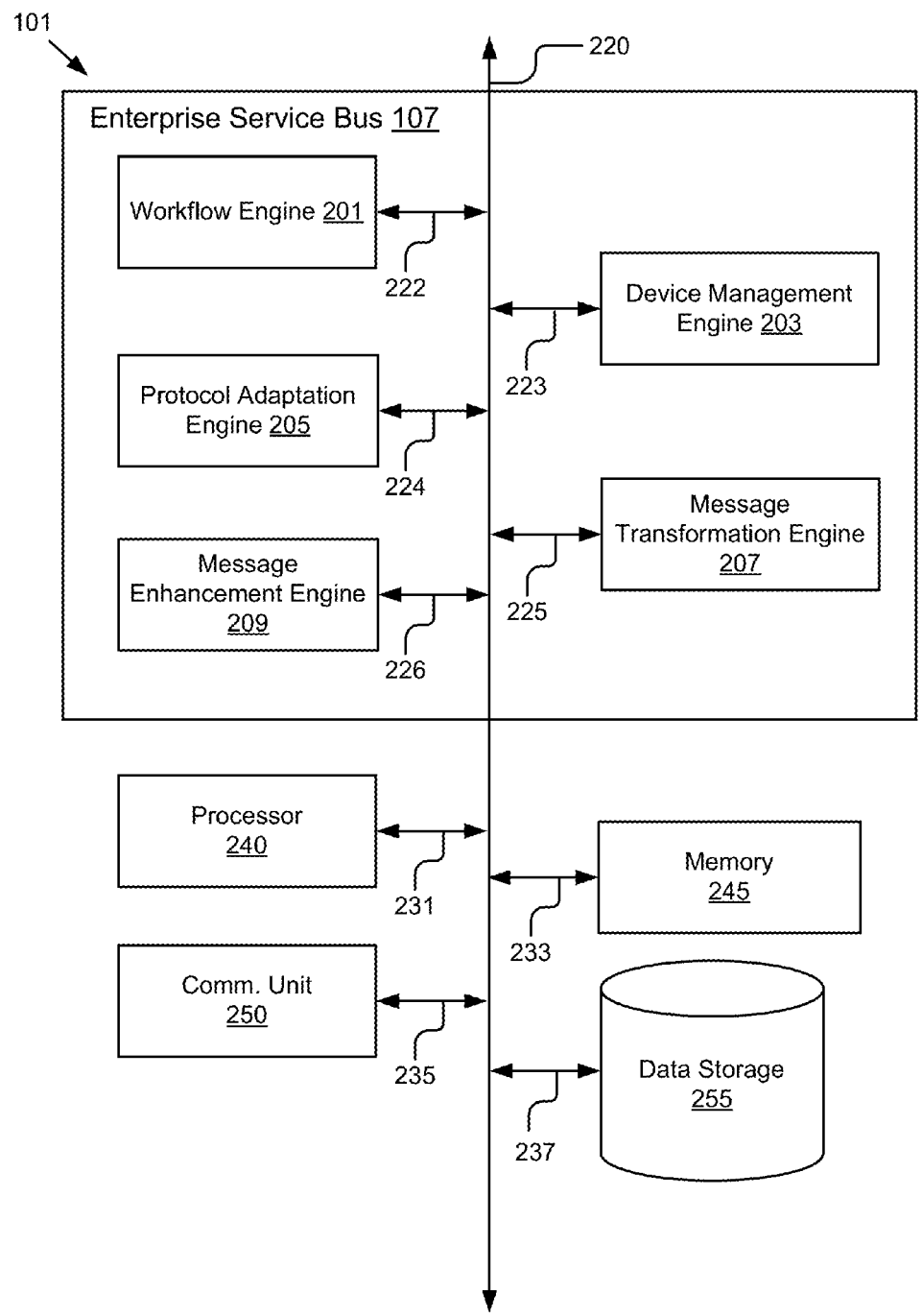
FIG. 2A is a block diagram illustrating one embodiment of an enterprise service bus.

Referring now to FIG. 2A, an example of the enterprise service bus 107 is shown in more detail. FIG. 2A is a block diagram of a NAaaS middleware server 101 that includes: a processor 240, a memory 245, a communication unit 250, a data storage 255 and the enterprise service bus 107.

The processor 240, the memory 245, the communication unit 250, a data storage 255 and the enterprise service bus 107 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the NAaaS middleware server 101 via signal line 231. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the NAaaS middleware server 101 via signal line 233. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 104 and other processing systems. The communication unit 250 receives data such as images, videos, or documents from a plurality of user devices 102a-102n. The communication unit 250 also receives requests for user profiles associated with a skill from the web server 120. The communication unit 250 transmits information to the plurality of computing devices 103a-103n. For example, the communication unit 250 transmits graphical data for displaying images or videos. The communication unit 250 is coupled to the bus 220 for communication with the other components of the NAaaS middleware server 101 via signal line 235.

In one embodiment, the communication unit 250 includes a port for direct physical connection to the user devices 102, the computing devices 103, the NAaaS application server 123, the web server 120 or to another communication channel. For example, the communication unit 250 includes an RJ14 or similar port for wired communication with the ESB 107. In another embodiment, the communication unit 250 includes a wireless transceiver for exchanging data with the user devices 102 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, FTP, HTTP, HTTPS and SMTP as will be understood to those skilled in the art.

The data storage 255 is a non-transitory memory that stores data for the functionality of the NAaaS middleware server 101. The data storage 255 is coupled to the bus 220 for communication with other components of the NAaaS middleware server 101 via signal line 237.

In one embodiment, the data storage 255 stores a library of communication protocols and messaging formats for protocol conversion. The communication protocols and messaging formats that the data storage 255 stores include, for example, Simple Object Access Protocol (SOAP), eXtensible Markup Language (XML), Java Message Service (JMS), File Transfer Protocol (FTP), Hypertext Transfer Protocol (HTTP), Message Queue (MQ), Internet Inter-Orb Protocol (HOP), Representational State Transfer (REST), JavaScript Object Notation (JSON), Distributed Component Object Model (DCOM), etc. In some embodiments, the protocol adaptation engine 205 accesses the protocols to convert requests into a protocol that is compatible with the recipient.

The enterprise service bus 107 includes: a workflow engine 201, a device management engine 203, a protocol adaptation engine 205, a message transformation engine 207 and a message enhancement engine 209. These components of the enterprise service bus 107 are communicatively coupled to each other via the bus 220.

The workflow engine 201 is software and routines for performing basic enterprise service bus functionalities and for handling communications between the components of the NAaaS middleware server 101 and other components of the system 100. In one embodiment, the workflow engine 201 is a set of instructions executable by the processor 240 to provide the functionality described below for receiving a request, routing the request, performing several steps and interacting with the NAaaS application services 106 and the computing devices 103 to satisfy the request. In either embodiment, the workflow engine 201 is adapted for cooperation and communication with the processor 240, the communication unit 250 and other components of the NAaaS middleware server 101 via the signal line 222.

The workflow engine 201 receives a request, processes the request and communicates with the NAaaS application services 106 and the computing devices 103 to complete the request. For example, the workflow engine 201 receives a request from a user device 102 for one of the computing devices 103 to project an image. The workflow engine 201 authenticates the user associated with the user device 102 by interacting with the user management service 211 that is part of the NAaaS application services 106, instructing the device usage analytics service 213 to log the command, a user identifier for the user associated with the user device 102, the date and time of the request and the IP address of the user device 102, copying the image that the user sent to the repository by interacting with the media repository service 215, performing optical character recognition of the image and indexing keywords in the image by interacting with the media analysis service 217 and transmits the image to the computing device 103 for projection.

The workflow engine 201 receives information via the communication unit 250 and transmits the information to the appropriate component of the enterprise service bus 107 or components of the system 100. In one embodiment, the workflow engine 201 receives a request to transmit media to a computing device 103. The workflow engine 201 can receive one or more types of media. The workflow engine 201 routes or transmits the media to the computing device 103. For example, the workflow engine 201 receives an image from a user device 102 (e.g., a smart phone) for display by a computing device 103 (e.g., a projector or a monitor). In another example, the workflow engine 201 receives a determination from the device management engine 203 that a computing device 103 needs service. The workflow engine 201 routes a notification generated by a maintenance notification service 283 that is part of the NAaaS application services 106 to a user, for example, an administrator that can service the computing device 103.

The device management engine 203 is code and routines for determining functionality associated with the one or more types of devices. In one embodiment, the device management engine 203 is a set of instructions executable by the processor 240 to provide the functionality described below for determining functionality associated with the one or more types of devices. In another embodiment, the device management engine 203 is stored in the memory 245 and is accessible and executable by the processor 240. In either embodiment, the device management engine 203 is adapted for cooperation and communication with the processor 240, the communication unit 250, the workflow engine 201 and other components of the server 101 via signal line 223.

In one embodiment, the device management engine 203 determines a list of functions associated with each of the plurality of devices. For example, the list of functions include power on, power off, projection, zoom, enhance, automatic focus, print, two-way video recording and transmission, two-way audio recording and transmission, language translation, text to speech translation and speech to text translation, etc.

In another embodiment, the device management engine 203 determines whether a user device 102 or a computing device 103 needs service. For example, the device management engine 203 instructs the device usage analytics service 213 to record information about each request that is routed through the enterprise service bus 107. The device management engine 203 then instructs the maintenance analysis service 281 to determine whether a device needs service based on the information logged by the device management service 212. If a device needs service, the device management engine 203 instructs the maintenance notification service 283 to generate a notification. The device management engine 203 provides the notification to the workflow engine 201, which routes the notification to an administrator.

The protocol adaptation engine 205 is software and routines for adapting and translating protocols. In one embodiment, the protocol adaptation engine 205 is a set of instructions executable by the processor 240 to provide the functionality described below for adapting and translating protocols. In either embodiment, the protocol adaptation engine 205 is adapted for cooperation and communication with the processor 240, the communication unit 250 and other components of the NAaaS middleware server 101 via the signal line 224.

In one embodiment, the protocol adaptation engine 205 receives a request from the workflow engine 201 in a first communication protocol and performs adaptation and translation to make the communication protocol compatible with the recipient of the request. For example, the protocol adaptation engine 205 receives an HTTP request from the user device 102 to "turn off" a projector. The projector communicates using TCP. The protocol adaptation engine 205 adapts an HTTP request to be forwarded to the projector using the TCP protocol.

The message transformation engine 207 is software and routines for transforming messages. In one embodiment, the message transformation engine 207 is a set of instructions executable by the processor 240 to provide the functionality described below for transforming messages. In either embodiment, the message transformation engine 207 is adapted for cooperation and communication with the processor 240, the communication unit 250 and other components of the NAaaS middleware server 101 via the signal line 225. For example, the message transformation engine 207 transforms the payload from an eXtensible Markup Language (XML) to JavaScript Object Notation (JSON).

Continuing with the above example, the request includes a JSON message that is passed to the message transformation engine 207 and the message enhancement engine 209:

```
"naaasprotocol": "1.0",
"device":
    {
        "category:" "PJS",
        "type": "SOLEIL",
        "url": "10.154.25.9"
    }
"userId": "3"
}
```

Where "naaasprotocol" is the Web API version of the platform, "PJS" designates the projector devices, "SOLEIL" is a type of projector, "url" is the device IP address for the projector and "userId" is the ID of the user operating the device. In one embodiment, the message transformation engine 207 translates the JSON message into XML.

The message enhancement engine 209 is software and routines for enhancing messages. In one embodiment, the message enhancement engine 209 is a set of instructions executable by the processor 240 to provide the functionality described below for enhancing messages. In either embodiment, the message enhancement engine 209 is adapted for cooperation and communication with the processor 240, the communication unit 250 and other components of the NAaaS middleware server 101 via the signal line 226.

The message enhancement engine 209 can also enhance the message by adding information not originally present in the request. For example, continuing with the example above, where the user wants to project an image onto a projector that requires additional authentication information, the message enhancement engine 209 retrieves the additional authentication information from the data storage 255 and adds it to the message. Once the message is ready, the message enhancement engine 209 transmits the message to the workflow engine 201 in the enterprise service bus 107, which transmits the message to the projector.

NAaaS Application Services

Figure 2B:
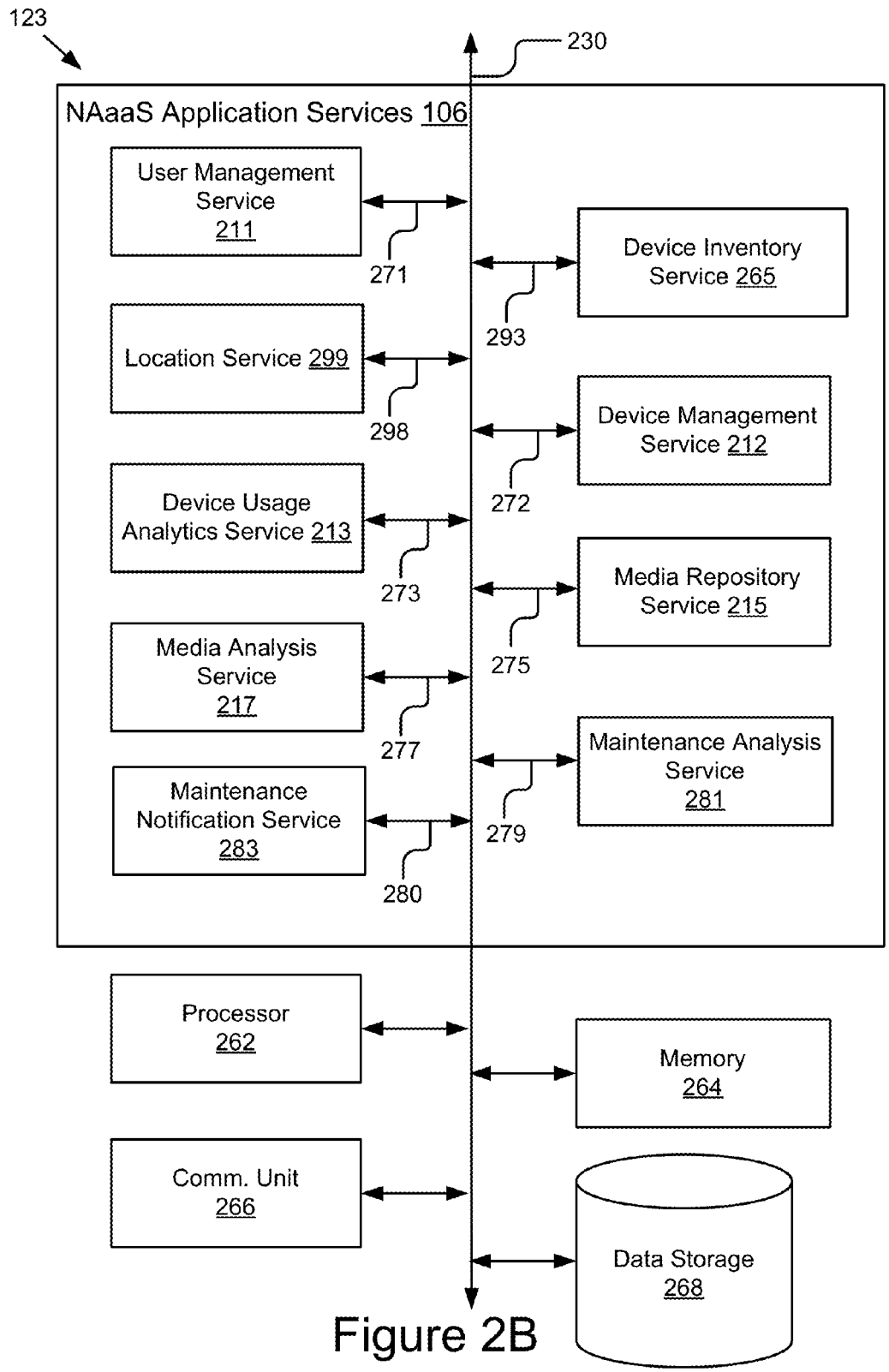
FIG. 2B is a block diagram illustrating one embodiment of Network Appliance as a Service application services.

FIG. 2B illustrates one embodiment of a NAaaS application server 123 that comprises NAaaS application services 106, a processor 262, a memory 264, a communication unit 266 and data storage 268. Some of the components of the NAaaS application server 123 have similar function and form as has been described above with reference to FIG. 2A so like reference numbers and terminology have been used to indicate similar functionality. For example, the communication bus 230, the processor 262, the memory 264 and the communication unit 266 are similar to that described above with reference to FIG. 2A so they will not be described here again.

In one embodiment, the data storage 268 stores device usage entries, an index of the media, the media and user profiles. The device usage entry describes transactions executed on the computing devices 103 and user identifiers associated with the transaction. In some embodiments, the device usage entry includes multiple user identifiers. For example, the device usage entry includes a user identifier for the presenter, e.g. a first user that sends a request from a user device 102 to project an image, video or document to a computing device 103 and a user identifier for the author of the media. The device usage entry includes the type of request (e.g., project, power on, power off, etc.), the type of device involved in the exchange of request and service (e.g., smart phone, projector, etc.), an IP address for the device, a measure of device resource spent (e.g., time, power, etc.), a type of functionality of the device used (e.g., auto-focus, enhance, imaging, etc.), a type of media exchanged (e.g., a presentation program document, a text document, a spreadsheet document, a video recording, an audio recording, an image, etc.), etc.

The data storage 268 stores an index of media. In one embodiment, the index of media includes records for each media including metadata for each media. For example, the metadata may include pointer data for accessing the original media (e.g. a full presentation instead of merely an image of a slide of the presentation) from the cloud, an author of the media, etc. In one embodiment, the metadata also includes results from the media analysis service 217, such as a text version of the image. In one embodiment, the data storage 268 also stores a copy of the media included in the requests. For example, the data storage 268 receives a copy of the media from the media repository service 215.

The data storage 268 stores user profiles. In one embodiment, the user profiles include records for each user. The records for each user may include a graphical representation of the user (e.g. a photo of the user), name, a title, keywords related to the user, media associated with the user (e.g., media authored by the user or media presented by the user), presentations associated with the user, etc. In one embodiment, the keywords related to the user include a list of keywords.

In one embodiment, the data storage 268 stores device information about user devices 102 or computing devices 103. In one embodiment, the device information includes life expectancy information associated with a device. The life expectancy information may include a lifespan of the device as a whole. In another embodiment, the life expectancy may include a lifespan of one or more parts of the device. For example, the life expectancy information may include a lifespan of a lamp of a projector. In one embodiment, the lifespan includes data based on a time of operation, a number of times used or a number of sessions or state changes (e.g., number times the device is turned on/off). The lifespan may include input data provided by an administrator. The lifespan may include data provided by a manufacturer of the device or part. The life expectancy may include breakdown points based on transaction data associated with the device. For example, a lamp of a projector burned out after a number of times the projector is turned on/off.

The NAaaS application services 106 is a collection of individual lower-level services with individual application programming interfaces (APIs) that are composed by the enterprise service bus 107 to deliver higher services. For example, a "project" command sent by a user device 102 to the enterprise service bus 107 will invoke a service in the NAaaS application services 106 that will authenticate the user device 102, identify text in the media and save the document in the data storage 268. The services do not communicate with each other. Instead the services receive instructions from the enterprise service bus 107, complete the requested task, save data in the data storage 268 if applicable and return information to the enterprise service bus 107.

In one embodiment the services include a user management service 211, a device management service 212, a device inventory service 265, a device usage analytics service 213, a media repository service 215, a media analysis service 217, a maintenance analysis service 281 and a maintenance notification service 283. Persons of ordinary skill in the art will recognize that the NAaaS application services 106 can compose additional services to complete requests.

The user management service 211 is code and routines for registering users in the network 104 and performing authentication of users. In one embodiment, the user management service 211 is a set of instructions executable by the processor 262 to provide the functionality described below for registering users. In another embodiment, the user management service 211 is stored in the memory 264 and is accessible and executable by the processor 262. In either embodiment, the user management service 211 is adapted for cooperation and communication with the processor 262 and the communication unit 266 via signal line 271.

The user management service 211 receives user information and generates a user profile. For example, the user management service 211 a name, a job title, a job code, an e-mail address, a phone number, a username, a password, a retina scan of the user, a fingerprint swipe of the user, etc. The user management service 211 generates login credentials for the user based on the registration information and stores the login credentials in the data storage 268 for the user. The user management service 211 associated a unique identifier with the user. This can be the user's full name, an email address for the user, a series of numbers, an employee identifier, etc. The unique identifier is used to track the user's activities in the system.

In one embodiment, the login credentials are generated as a single sign-on with a property that provides access control to multiple and independent devices and services using the same login credentials. For example, a user logs in with the user credentials and gains access to all registered services without being prompted to login at each one of them. In another example, a user logs into different types of devices such as a projector, an interactive whiteboard, etc. using the same user credentials. In one embodiment, the user management service 211 stores the login credentials of users as an organized set of records with a hierarchical structure in a Lightweight Directory Access Protocol (LDAP) server (not shown) associated with a business. The user management service 211 also manages preferences for the user that are received during registration or at other times. For example, the user can upload an image to associate with the login credentials.

In some embodiments where the user devices 102 and/or computing devices 103 use different login information than the login information used to authenticate the user with the system 100, the user management service 211 receives the login information from the user or an administrator and adds the information to the user's profile. For example, a user's laptop includes a four-digit code that needs to be input before the user can access the contents of the laptop. The user management service 211 adds the information to the user's profile.

The user management service 211 performs authentication. For example, a user enters login credentials into a user interface on the user device 102. The user device 102 transmits the login credentials to the enterprise service bus 107, which requests that the user management service 211 authenticate the user based on the login credentials. The user management service 211 identifies the user associated with the user device 102, compares the login credentials to the user profile and either sends a confirmation back to the enterprise service bus 107 that the login credentials were correct or a notification that there was a login error. The confirmation includes the user identification associated with the user.

In one embodiment, if the login request for authentication does not include a correct user name and password, the login request is denied. In another embodiment, the user management service 211 is used in account recovery when the user has forgotten his, or her, username and/or password. In some instances, the user management service 211 detects a potentially fraudulent authentication by analyzing the secondary information included in the login request. For example, if the username associated with the login request is a username of a user no longer employed at a company, or a suspected bot, the user management service 211 identifies the login request as potentially fraudulent. The user management service 211 detects a potentially fraudulent authentication by comparing the secondary information to historical authentication information of the user. For example, if the login request for authentication originates from a country, or device, that the user has not attempted to send login requests from before (e.g., unregistered device), the user management service 211 identifies the login request as potentially fraudulent. In one embodiment, a potentially fraudulent authentication attempt includes a failed authentication attempt.

The device inventory service 265 is code and routines for registering devices in the network 104. In one embodiment, the device inventory service 265 is a set of instructions executable by the processor 262 to provide the functionality described below for registering devices. In another embodiment, the device inventory service 265 is stored in the memory 264 and is accessible and executable by the processor 262. In either embodiment, the device inventory service 265 is adapted for cooperation and communication with the processor 262 and the communication unit 266 via signal line 293.

The device inventory service 265 receives requests to add, remove and update devices in the network 104 from the workflow engine 201. The device inventory service 265 receives a request to register one or more types of user devices 102a-102n and one or more types of computing devices 103a-103n. In one embodiment, the device inventory service 265 registers the type of device and an IP address (or MAC address) for the device with the network 104 and creates a device identifier specific for the device. For example, a new projector with model number 1042 is registered and assigned a device identifier, such as, prj1042ul. In one embodiment, the device inventory service 265 receives a request to register one or more types of user devices 102a-102n under a particular username stored in the data storage 268. For example, a user can register personal devices such as a tablet PC, a smartphone, etc. and associate the devices with a form of identification, such as an employee identifier, user identifier, etc. In another embodiment, the device inventory service 265 receives a request to register the one or more types of computing devices 103a-103n for use at a particular location or within certain limits of space. For example, a projector can be registered for use on the first floor of a building and an interactive whiteboard can be registered for use in a conference room. The first floor of the building and the conference room each has a location identifier associated with them. The device inventory service 265 stores the device registration information (e.g., IP addresses, device identifiers, etc.) in the data storage 268.

In another embodiment, the device inventory service 265 identifies devices associated with a location using a location identifier generated by the location service 299. The location identifier is received from the device management engine 203 for storing in the data storage 268. For example, a projector can be registered to a conference room in a building in Tokyo, Japan and the conference room has a location identifier. A user can access the projector from San Francisco, Calif. using the login credentials indicating the user is a registered user. In yet another embodiment, the device inventory service 265 receives requests to update information associated with the devices that are registered. For example, a user can change the name of a projector, the location of an interactive whiteboard and the firmware version on the video conferencing device, etc.

The location service 299 is code and routines for providing and storing location information of one or more types of devices. In one embodiment, the location service 299 is a set of instructions executable by the processor 262 to provide the functionality described below for storing device location information. In another embodiment, the location service 299 is stored in the memory 264 and is accessible and executable by the processor 262. In either embodiment, the location service 299 is adapted for cooperation and communication with the processor 262 and the communication unit 266 via signal line 298.

In one embodiment, the device management engine 203 from the enterprise service bus 107 interacts with the location service 299 to store location information including name, geographical coordinates, location identifier, etc. of the one or more types of devices. For example, the device management engine 203 performs a device discovery process using specific protocols like SNMP, ICMP, Bonjour, etc. and sends the results to the location service 299 to process and store in the data storage 268. In another embodiment, the location service 299 receives a request to register a location before devices can be registered or assigned to the location. For example, a user may register the location of a new branch in Singapore before another user from Menlo Park, Calif. can send media to the devices that are registered at the Singapore location.

The device management service 212 is code and routines for reserving devices in the network 104 and granting access to the devices. In one embodiment, the device management service 212 is a set of instructions executable by the processor 262 to provide the functionality described below for reserving devices. In another embodiment, the device management service 212 is stored in the memory 264 and is accessible and executable by the processor 262. In either embodiment, the device management service 212 is adapted for cooperation and communication with the processor 262 and the communication unit 266 via signal line 272.

In one embodiment, the device management service 212 receives a request to reserve one or more types of computing devices 103a-103n that are shared with a group of people, for example, employees in a company. For example, a user employee can reserve a projector, an interactive whiteboard, etc. temporarily under his username or user identifier for use in a business meeting. In another example, the user employee can supply a device identifier along with the user identifier for reserving devices. The device management service 212 grants an access request for a user of the group to the one or more types of computing devices 103a-103n that are registered previously using the user's login credentials created by the user management service 211. For example, the user accesses computing devices 103a-103n such as a projector, a webcam, an interactive whiteboard, etc. using one and the same username and password.

The device usage analytics service 213 is code and routines for logging device usage entries associated with the requests in the network 104. In one embodiment, the device usage analytics service 213 is a set of instructions executable by the processor 262 to provide the functionality described below for logging device usage entries. In another embodiment, the device usage analytics service 213 is stored in the memory 264 and is accessible and executable by the processor 262. In either embodiment, the device usage analytics service 213 is adapted for cooperation and communication with the processor 262 and the communication unit 266 via signal line 273.

The device usage analytics service 213 receives a request and a user identifier associated with the request and logs the metadata associated with the request as a device usage entry. If the user associated with request is different from the author of the media, the device usage entry includes a user identifier for both the presenter and the author of the media. For example, a doctor gives a talk about a medical subject to residents at a hospital by using slides that are transmitted from the professor's user device 102 (e.g. a laptop) to a computing device 103 (e.g. a projector). Each time the doctor wants to display a slide on the projector, the doctor sends a request to display an image of the slide from the laptop to the projector. The enterprise service bus 107 transmits the request to the user management service 211, which identifies the user associated with the user device 102. The enterprise service bus 107 receives a confirmation of authentication from the user management service 211 and an identity of the user and transmits the request and user identifier to the device usage analytics service 213, which logs a device usage entry. In one embodiment, the device usage entry includes a user identifier for the user associated with the user device 102, an author of the media (if different), a set of actions performed on the computing device 103 and a unique identifier referring to the stored media in the data storage 268.

The media repository service 215 is code and routines for storing media associated with a request in data storage 268. In one embodiment, the media repository service 215 is a set of instructions executable by the processor 262 to provide the functionality described below for storing media. In another embodiment, the media repository service 215 is stored in the memory 264 and is accessible and executable by the processor 262. In either embodiment, the media repository service 215 is adapted for cooperation and communication with the processor 262 and the communication unit 266 via signal line 275.

The media repository service 215 receives a request from the enterprise service bus 107 that includes media. The media repository service 215 generates a unique identifier associated with the media and stores the media in the data storage 268.

The media analysis service 217 is code and routines for analyzing media. In one embodiment, the media analysis service 217 is a set of instructions executable by the processor 262 to provide the functionality described below for analyzing media. In another embodiment, the media analysis service 217 is stored in the memory 264 and is accessible and executable by the processor 262. In either embodiment, the media analysis service 217 is adapted for cooperation and communication with the processor 262 and the communication unit 266 via signal line 277.

The media analysis service 217 receives media associated with a request from the enterprise service bus 107. For example, the media analysis service 217 receives an image that was captured from a slide. The media analysis service 217 applies optical character recognition to the image to identify text associated with the image. The media analysis service 217 stores the text in the data storage 268. In one embodiment, the media analysis service 217 converts content from the image including handwritten, typewritten or printed text to machine-encoded text.

In one embodiment, the media analysis service 217 receives video and/or audio data. The media analysis service 217 may identify a user associated with the video and/or audio data received from a video conferencing device. For example, a video may include the doctor from the example above giving the presentation in front of an interactive whiteboard. The media analysis service 217 may identify the doctor based on performing facial recognition on the video data or performing voice analysis on the audio data. In another embodiment, the media can be provided by audience members that participate in an event. The media analysis service 217 determines an event. For example, the media analysis service 217 determines a presentation. The media analysis service 217 determines audience members at an event. In some embodiments, the media analysis service 217 determines audience member attendance based on location of a user device 102. The media analysis service 217 determines which audience members participated in the event. In one embodiment, the media analysis service 217 determines which audience members participated in an event based on performing facial recognition from video data or performing voice analysis on the audio data.

In one embodiment, the media analysis service 217 receives video data of an event or a presentation from the enterprise service bus 107. For example, the video includes a person in front of an interactive whiteboard for presenting information. The media analysis service 217 may perform face recognition on one or more frames of the video. For example, the media analysis service 217 performs optical character recognition on the information presented on the interactive whiteboard. In another embodiment, the media analysis service 217 receives audio data. The media analysis service 217 may identify text from the audio data by using speech-to-text technology.

The maintenance analysis service 281 is code and routines for monitoring device usage and determining when to send a notification. In one embodiment, the maintenance analysis service 281 is a set of instructions executable by the processor 262 to provide the functionality described below for monitoring device usage. In another embodiment, the maintenance analysis service 281 is stored in the memory 264 and is accessible and executable by the processor 262. In either embodiment, the maintenance analysis service 281 is adapted for cooperation and communication with the processor 262 and other components of the NAaaS application server 123 via the signal line 279.

The maintenance analysis service 281 determines usage information for a computing device 103. In one embodiment, the device management engine 203 instructs the maintenance analysis service 281 to determine usage information from device usage entries for the computing device 103. In one embodiment, the maintenance analysis service 281 determines the usage information based on the type of transactions. For example, the device management engine 203 provides the maintenance analysis service 281 with device usage entries associated with a projector. The device usage entries include usage information for turning on a projector, projecting an image, etc.

In one embodiment, the maintenance analysis service 281 may determine a time of operation, a number of times the computing device 103 was used or a number of state changes (e.g., number times turned on or off) for a computing device 103. For example, the maintenance analysis service 281 determines a number of hours based on requests to perform one or more operations on a computing device 103 by one or more user devices 102. In one embodiment, the maintenance analysis service 281 determines usage information for the computing device 103 includes determining usage information for a part of the computing device 103. For example, the maintenance analysis service 281 determines a number of hours of operation for a lamp of a projector based on one or more transactions for projecting images and or video by the projector. Each different operation on the computing device 103 may contribute different levels of demand on the computing device 103. In another example, the maintenance analysis service 281 determines a number of hours of operation for a medical device (e.g., an ultrasound machine, an x-ray machine, an MRI machine) in a medical facility. The maintenance analysis service 281 saves the usage information to the data storage 268. In another embodiment, the device usage analytics service 213 saves the above information as part of the device usage entry.

The maintenance analysis service 281 retrieves a life expectancy associated with the computing device 103 from data storage 268 or the maintenance analysis service 281 receives the life expectancy from the device management engine 203. In one embodiment, the maintenance analysis service 281 retrieves device information for the computing device 103. For example, the maintenance analysis service 281 retrieves lifespan data including a number of hours for a lamp of a projector. In one embodiment, the lifespan includes input data provided by an administrator. In another embodiment, the maintenance analysis service 281 retrieves a life expectancy associated with the computing device 103 by retrieving transaction data for another computing device 103 similar to the computing device 103, for example, projectors having the same model number. In another example, the projectors may have common components or parts (e.g., lamps, fans). In one embodiment, the transaction data for the other computing device 103 includes breakdown points. The breakdown points may include historical failures for the computing device 103. For example, a lamp of a projector burned out after 2,000 on/off sessions and/or 20,000 hours of projection time. In one embodiment, the maintenance analysis service 281 updates the life expectancy for the computing device based on the historical failures of the similar or same device. In one embodiment, the computing device 103 is associated with an organization different from the organization associated with the similar device.

The maintenance analysis service 281 performs a comparison between the life expectancy and the usage information. In one embodiment, the maintenance analysis service 281 compares the life expectancy and the usage information to determine whether a usage of the collaboration computing device 103 exceeds the life expectancy. In another embodiment, the maintenance analysis service 281 determines whether the usage of the collaboration computing device 103 is near or approaching the life expectancy. For example, the maintenance analysis service 281 determines whether the usage is within a range of the life expectancy. The maintenance analysis service 281 transmits the determination to the device management engine 203.

The maintenance analysis service 281 can determine the life expectancy in different ways. In one embodiment, the maintenance analysis service 281 determines that the computing device 103 exceeds life expectancy based on an overall usage of the computing device 103. For example, the operation time of a projector may exceed the 4,000 hours life expectancy of a lamp of the projector. In another example, the operation time of an x-ray machine may exceed the life expectancy of 20,000 hours of an x-ray tube. In one embodiment, maintenance analysis service 281 determines that the computing device 103 exceeds life expectancy based on the usage being within a threshold value. For example, the maintenance analysis service 281 determines that the life expectancy is in a certain range, but that a notification should be generated after the usage exceeds a threshold within the range. For example, the projector has a life expectancy of between 3,500-4,000 hours of use, but a notification is generated after the usage exceeds 3,800 hours.

In one embodiment, the maintenance analysis service 281 determines an identity of a user associated with the computing device 103. For example, the maintenance analysis service 281 determines one or more users from transactions associated with the computing device 103. The maintenance analysis service 281 may determine an importance of the user. In one embodiment, the maintenance analysis service 281 generates a notification based on the importance of the one or more users or a frequency of use of the computing device 103. For example, if the computing device 103 is used by a vice president, the maintenance analysis service 281 determines that the user should receive a notification before the computing device 103 has exceeded its life expectancy. In another example, if the computing device 103 is used by an administrative assistance, the maintenance analysis service 281 determines that the user should receive a notification after the computing device 103 has exceeded its life expectancy.

In another embodiment, the maintenance analysis service 281 determines whether to send a notification based on a frequency that the computing device 103 is used. The maintenance analysis service 281 determines the frequency of use based on the device usage entries associated with a device. For example, if the computing device 103 is used every day, it would be more disruptive to a business if the computing device 103 failed and had to be serviced. If the computing device 103 is only used once a month, however, the user may prefer to risk device failure.

The maintenance notification service 283 is code and routines for generating maintenance notifications. In one embodiment, the maintenance notification service 283 is a set of instructions executable by the processor 262 to provide the functionality described below for generating maintenance notifications. In another embodiment, the maintenance notification service 283 is stored in the memory 264 and is accessible and executable by the processor 262. In either embodiment, the maintenance notification service 283 is adapted for cooperation and communication with the processor 262 and other components of the NAaaS application server 123 via the signal line 280.

In one embodiment, the notification includes a recommendation for replacing or retiring the computing device 103. In another embodiment, the notification includes a recommendation for replacing a part of the computing device 103. For example, the notification includes a recommendation for replacing the lamp of a projector. In another embodiment, the notification includes a recommendation for cleaning or re-calibration of the device.

In one embodiment, the maintenance notification service 283 generates the notification by generating an SMS message or an MMS message. In another embodiment, the maintenance notification service 283 generates an email. In another embodiment, the maintenance notification service 283 generates a user interface that includes the recommendation. An example of the user interface that includes the recommendation is described below in more detail with reference to FIG. 3. The maintenance notification service 283 transmits the notification to the workflow engine 201, which transmits the notification to the user.

FIG. 3 is a graphic representation 300 of an example user interface for monitoring device usage generated by the user interface engine 121 on the web server 120. The user interface includes an input 301 for specifying a device by a user. In one embodiment, the input 301 includes a drop-down list for selecting the device. The user interface includes a name and an icon 302 that represents the device. In the illustrated embodiment, the icon 302 includes an image that represents a projector having the name "DLP Projector 1." The user interface includes usage information 304 associated with the device. In the illustrated embodiment, the usage information 304 includes a number of power on/off sessions, a number of projections and a number of lamp hours. The user interface includes notification information 306 including one or more maintenance recommendations for the device. In the illustrated embodiment, the notification information 306 includes information for replacing a lamp in the projector that is near a life expectancy. The notification information 306 further includes information for replacing an air filter of the projector that exceeds the life expectancy.

Methods

Figure 4:
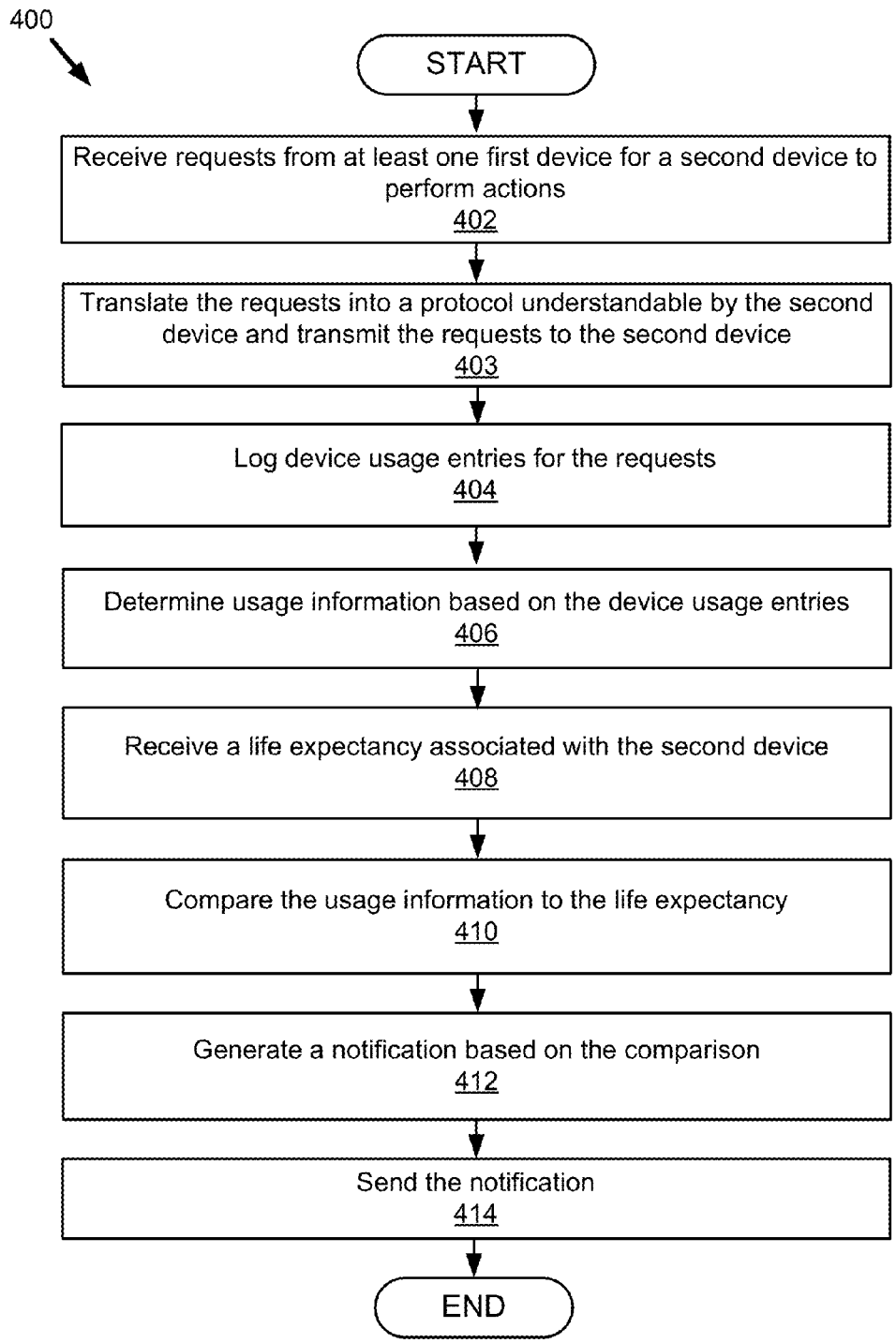
FIG. 4 is a flow diagram of an embodiment of a method for monitoring device usage.
Figure 5:
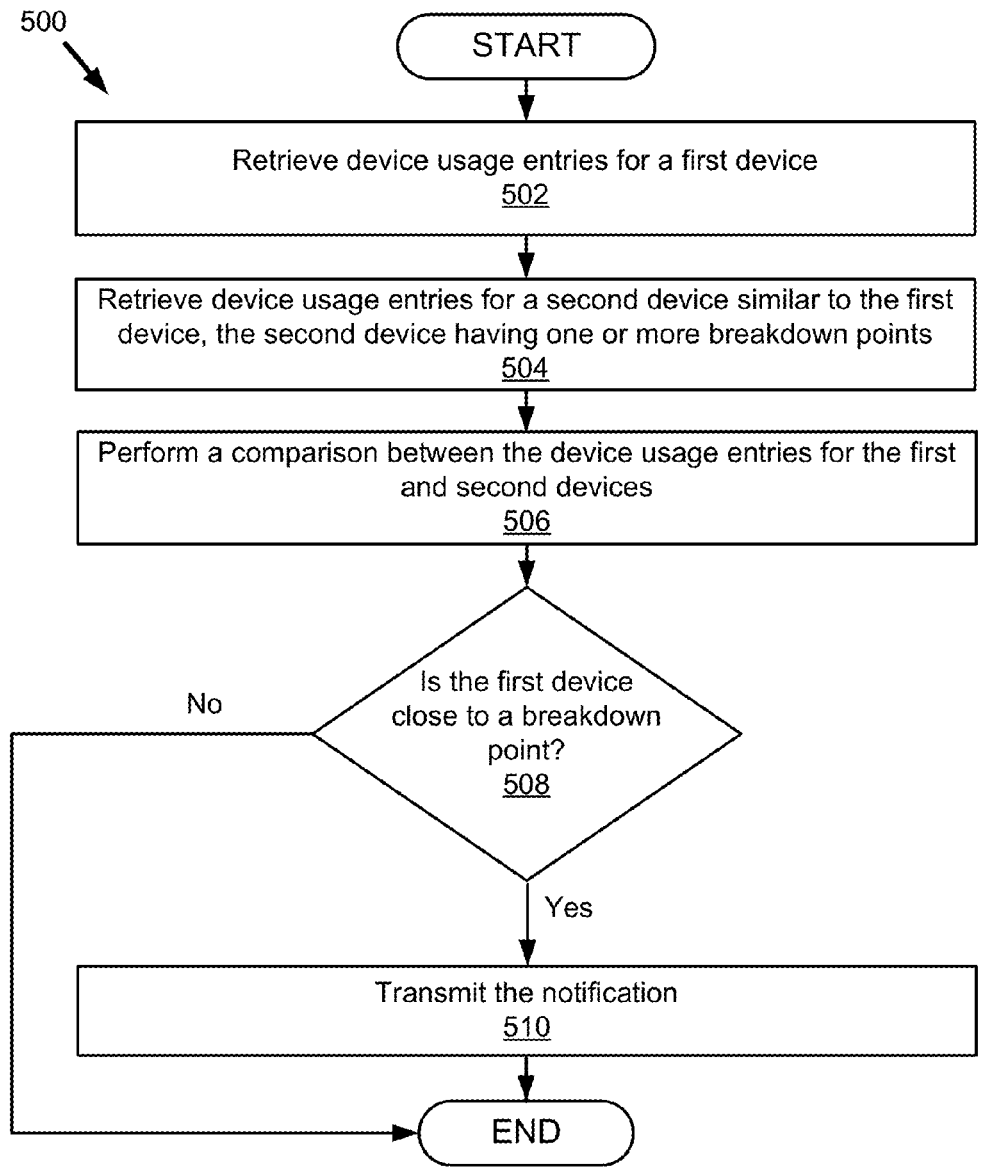
FIG. 5 is a flow diagram of another embodiment of a method for monitoring device usage.

Referring now to FIGS. 4 and 5, various embodiments of the methods of the invention will be described. FIG. 4 is a flow diagram 400 of an embodiment of a method for monitoring device usage using an enterprise service bus 107 and NAaaS application services 106. The enterprise service bus 107 includes a workflow engine 201, a device management engine 203, a protocol adaptation engine 205, a message transformation engine 207 and a message enhancement engine 209. The NAaaS application services 106 include a user management service 211, a device usage analytics service 213, a media repository service 215, a media analysis service 217, a maintenance analysis service 281 and a maintenance notification service 283.

The workflow engine 201 receives 402 requests from at least one first device for a second device to perform actions. For example, the user device 102 transmits a request to the workflow engine 201 for instructing the computing device 103 to project an image. Optionally, the workflow engine 201 transmits the requests to the protocol adaptation engine 205 for translating 403 requests into a protocol understandable by the second device. In some embodiments, the message transformation engine 207 transforms messages from a first message format to a second message format. In another embodiment, the message enhancement engine 209 enhances the message by adding information to the message. The workflow engine 201 transmits the request to the second device.

The workflow engine 201 instructs the device usage analytics service 213 to log 404 device usage entries for the requests. For example, the device usage entry includes the type of request, the type of device involved in the exchange of request and service, an IP address for the device, a measure of device resource spent, a type of functionality of the device used and a type of media exchanged. In one embodiment, the workflow engine 201 receives the request during a presentation or meeting. For example, the presentation may include a professor giving a lecture related to one or more subjects. The professor uses a smart phone for requesting to transmit an image to a projector for display. The image may include one or more slides related to the lecture. Steps 402 to 404 can be performed multiple times.

At some point, the device management engine 203 instructs the maintenance analysis service 281 to determine 406 usage information based on the device usage entries. For example, the maintenance analysis service 281 determines usage information periodically (e.g., every day, every week, every month) or in response to a user request. In one embodiment, the device maintenance analysis service 281 determines a time of operation, a number of times used or a number of state changes (e.g., number times turned on or off) for the second device. For example, the maintenance analysis service 281 determines a number of hours based on requests to perform an operation on the second device by one or more first devices.

The maintenance analysis service 281 receives 408 a life expectancy associated with the second device from the device management engine 203 or the maintenance analysis service 281 retrieves the life expectancy from data storage 268. For example, the maintenance analysis service 281 receives lifespan data including a number of hours for a lamp of a projector. The device management engine 203 instructs the maintenance analysis service 281 to compare 410 the usage information to the life expectancy. In one embodiment, the maintenance analysis service 281 compares the life expectancy and the usage information to determine whether a usage of the second device exceeds the life expectancy. In another embodiment, the maintenance analysis service 281 determines whether the usage of the second device is near the life expectancy. For example, the maintenance analysis service 281 determines whether the usage is within a range of the life expectancy.

The device management engine 203 instructs the maintenance notification service 283 to generate 412 a notification based on the comparison. In one embodiment, the maintenance notification service 283 generates the notification based on whether the usage of the second device is within a range of the life expectancy. In another embodiment, the maintenance notification service 283 generates the notification in response to the comparison between the life expectancy and the usage being within a threshold value. In one embodiment, the maintenance notification service 283 generates the notification by generating an SMS message or an MMS message. In another embodiment, the maintenance notification service 283 generates an email. In another embodiment, the maintenance notification service 283 generates a user interface that includes the recommendation. The workflow engine 201 sends 414 the notification. For example, the workflow engine 201 sends the notification to an administrator. In some embodiments, the notification transmitted to the administrator includes an alert that the second device is approaching an end of its life expectancy.

FIG. 5 is a more detailed flow diagram 500 of an embodiment of a method for monitoring device usage. The device management engine 203 instructs the maintenance analysis service 281 to retrieve 502 device usage entries for a first device. Alternatively, the device management engine 203 transmits the device usage entries to the maintenance analysis service 281. For example, the maintenance analysis service 281 receives a device usage entries describing a request for instructing the first device to project an image, a request to turn the projector on, a request to turn the projector off and how long elapsed between the on request and the off request, etc. The maintenance analysis service 281 retrieves 504 device usage entries for a second device similar to the first device. For example, projectors having the same model number. In another example, the projectors may have common components or parts (e.g., lamps, fans). The device usage entries for the second device includes one or more breakdown points.

The maintenance analysis service 281 performs 506 a comparison between the device usage entries for the first and second devices. The maintenance analysis service 281 determines 508 whether the first device is close to a breakdown point. In response to determining that the first device is close to a breakdown point, the device management engine 203 instructs the maintenance notification service 283 to generate a notification. The workflow engine 201 transmits 510 a notification. In one embodiment, the workflow engine 201 transmits to the notification to an administrator. In response to determining that the first device is not close to the breakdown point, the method ends.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, with one or more processors of a server, a request using a first communication protocol from a first device for a second device to perform an action;
   translating the request, with the one or more processors of the server, into a second communication protocol understandable by the second device;
   routing the translated request, with the one or more processors of the server, to the second device using the second communication protocol;
   logging, with the one or more processors of the server, a device usage entry for the request;
   determining, with the one or more processors of the server, usage information based on the device usage entry;
   comparing, with the one or more processors of the server, the usage information to a life expectancy associated with the second device; and
   generating, with the one or more processors of the server, a notification for presentation to a user based on the comparison.

2. The method of claim 1, wherein the usage information is further determined based on a time of operation of the second device, a number of times the second device was used and a number of state changes for the second device.

3. The method of claim 1, further comprising:
   receiving, with the one or more processors of the server, device usage entries for a third device that is similar to the second device, the third device experiencing one or more breakdown points;
   performing, with the one or more processors of the server, a comparison between the device usage entries for the third and second devices; and
   wherein the notification is generated responsive to the second device having a life expectancy close to the life expectancy of the third device when it experienced the one or more breakdown points.

4. The method of claim 3, wherein the third device is a same type of device as the second device.

5. The method of claim 1, wherein the notification is transmitted to an administrator and includes an alert that the second device is approaching an end of its life expectancy.

6. The method of claim 1, further comprising:
   determining an identity of a user associated with the second device; and
   determining whether to replace the second device depending on an importance of the user or a frequency of use of the second device.

7. The method of claim 1, wherein the life expectancy is based on a number of transactions that occurred in other devices of a same type as the second device and further comprising updating the life expectancy responsive to a failure occurring in the second device.

8. A system comprising:
   one or more processors;
   an enterprise service bus executable by the one or more processors, the enterprise service bus configured to receive a request using a first communication protocol from a first device for a second device to perform an action, translate the request into a second communication protocol understandable by the second device and route the translated request to the second device using the second communication protocol; and
   application services executable by the one or more processors, the application services configured to receive instructions from the enterprise service bus to log a device usage entry for the request, determine usage information based on the device usage entry, compare the usage information to a life expectancy associated with the second device and generate a notification for presentation to a user based on the comparison.

9. The system of claim 8, wherein the usage information is further determined based on a time of operation of the second device, a number of times the second device was used and a number of state changes for the second device.

10. The system of claim 8, wherein the application services are further configured to:
   receive device usage entries for a third device that is similar to the second device, the third device experiencing one or more breakdown points; and
   wherein the notification is generated responsive to the second device having a life expectancy close to the life expectancy of the third device when it experienced the one or more breakdown points.

11. The system of claim 10, wherein the third device is a same type of device as the second device.

12. The system of claim 8, wherein the notification is transmitted to an administrator and includes an alert that the second device is approaching an end of its life expectancy.

13. The system of claim 8, wherein the application services are further configured to:
   determine an identity of a user associated with the second device; and
   determine whether to replace the second device depending on an importance of the user or a frequency of use of the second device.

14. The system of claim 8, wherein the life expectancy is based on a number of transactions that occurred in other devices of a same type as the second device and the application services are further configured to update the life expectancy responsive to a failure occurring in the second device.

15. A computer program product comprising a computer usable medium including a computer readable program, wherein the computer readable program when executed on a computer causes the computer to:
   receive a request in a first communication protocol from a first device for a second device to perform an action;
   translate the request into a second communication protocol understandable by the second device;
   route the translated request to the second device;
   log a device usage entry for the request;
   determine usage information based on the device usage entry;
   compare the usage information to a life expectancy associated with the second device; and
   generate a notification for presentation to a user based on the comparison.

16. The computer program product of claim 15, wherein the usage information is further determined based on a time of operation of the second device, a number of times the second device was used and a number of state changes for the second device.

17. The computer program product of claim 15, further causing the computer to:
   receive device usage entries for a third device that is similar to the second device, the third device experiencing one or more breakdown points;
   performing a comparison between the device usage entries for the third and second devices; and
   wherein the notification is generated responsive to the second device having a life expectancy close to the life expectancy of the third device when it experienced the one or more breakdown points.

18. The computer program product of claim 17, wherein the third device is a same type of device as the second device.

19. The computer program product of claim 15, wherein the notification is transmitted to an administrator and includes an alert that the second device is approaching an end of its life expectancy.

20. The computer program product of claim 15, further causing the computer to:
   determine an identity of a user associated with the second device; and
   determine whether to replace the second device depending on an importance of the user or a frequency of use of the second device.

* * * * *